UNITED STATES PATENT OFFICE.

FREDERICK RANSOME, OF IPSWICH, GREAT BRITAIN.

IMPROVEMENT IN PRESERVING TIMBER.

Specification forming part of Letters Patent No. 55,216, dated May 29, 1866.

*To all whom it may concern:*

Be it known that I, FREDERICK RANSOME, of Ipswich, in the county of Suffolk, England, have invented or discovered new and useful Improvements in Treating Timber for the Purpose of Preserving the same; and I, the said FREDERICK RANSOME, do hereby declare the nature of the said invention and in what manner the same is to be performed to be particularly described and ascertained in and by the following statement thereof—that is to say:

This invention has for its object improvements in treating timber for the purpose of preserving the same. For this purpose I apply to the timber a solution of silicate of soda or potash by preference, forcing the said solution into the pores of the wood, and afterward I apply a solution of chloride of calcium or other soluble salt of an alkaline earth, or chloride of aluminium or iron by preference, forcing the same into the pores of the wood, as before.

In carring out this process I prefer to place the wood to be operated upon in a suitable air-tight vessel capable of sustaining considerable pressure, and, after exhausting the air from the vessel and from the cells of the wood by means of an air-pump or otherwise, I admit a solution of silicate, the specific gravity of which may conveniently be from 1.100 to 1.200, and by means of a force-pump connected with the vessel I drive the silicate into the pores or cells of the wood; or I brush over the surface of the wood with the solution of soluble silicate, or I immerse it in the solution.

When the silicate has become dry, I prefer, as before, to place the timber in a suitable air-tight vessel, and, after exhausting the air by means of an air-pump or otherwise, to force in a solution of chloride of calcium of specific gravity of from 1.100 to 1.200, or a solution of other soluble salt of an alkaline earth, or a solution of chloride of aluminium or iron by means of a hydraulic or other pump; or I brush freely over the surface of the wood with the solution of chloride of calcium or other solution, as before mentioned, or I immerse the wood in the solution, the object being in all these cases, by aid of the solution of chloride of calcium or other salt, to convert the soluble silicate of soda or other alkali into an insoluble silicate either of lime or other base.

What I claim is—

Treating timber for the purpose of preserving the same with a solution of silicate of soda or potash, and afterward with a solution of chloride of calcium or other soluble salt of an alkaline earth or chloride of aluminium or iron, substantially as described.

FREDK. RANSOME.

Witnesses:
   A. J. WARREN,
   H. SOUTER,
*Both of No. 17 Gracechurch Street, London, E. C.*